United States Patent [19]

Hesse et al.

[11] Patent Number: 4,804,722

[45] Date of Patent: Feb. 14, 1989

[54] RESIN SOLUTIONS FOR CEMENTS AND COATING COMPOSITIONS, PROCESS FOR THEIR PREPARATION AND THEIR USE

[75] Inventors: Wolfgang Hesse, Taunusstein; Klaus Rauhut, Wiesbaden, both of Fed. Rep. of Germany

[73] Assignee: Hoechst AG, Fed. Rep. of Germany

[21] Appl. No.: 85,074

[22] Filed: Aug. 13, 1987

Related U.S. Application Data

[63] Continuation of Ser. No. 804,282, Dec. 3, 1985, abandoned.

[30] Foreign Application Priority Data

Dec. 5, 1984 [DE] Fed. Rep. of Germany ....... 3444281

[51] Int. Cl.$^4$ ............... C08G 65/36; C08G 59/62; C08F 283/10
[52] U.S. Cl. ............................. 525/523; 528/107; 528/110
[58] Field of Search ............... 525/523, 524; 528/107, 528/110

[56] References Cited

U.S. PATENT DOCUMENTS 3,268,466  8/1966  Simm .................................. 528/110
3,491,041  1/1970  Dornte ............................... 528/110

Primary Examiner—Paul R. Michl
Assistant Examiner—Mark R. Buscher
Attorney, Agent, or Firm—Bierman and Muserlian

[57] ABSTRACT

Resin solution for cements and coating compositions based on a reaction product of epoxy resins having more than one epoxy group in the molecule and furfuryl alcohol alone or in admixture with other furan derivatives dissolved in reactive diluents and process for its preparation. These resin solutions are used for preparing cements and coating compositions by mixing the resin solution immediately before use with (A) at least one filler and (B) at least one curing agent or a mixture of (A) and (B), the weight ratio of the solution to the sum of components (A) and (B) being 1:(0.5–7), preferably 1:(1–4).

17 Claims, No Drawings

RESIN SOLUTIONS FOR CEMENTS AND COATING COMPOSITIONS, PROCESS FOR THEIR PREPARATION AND THEIR USE

PRIOR APPLICATION

This application is a continuation of copending U.S. patent application Ser. No. 804,282 filed Dec. 3, 1985, now abandoned.

It is known to use polycondensates of furfuryl alcohol as binders for acid-curing cements. The second main component of these cements are fillers to which acids or acid-eliminating substances are admixed as curing catalysts which can effect curing without supply of heat.

It is also known from German Pat. No. 2,926,053 to react furfuryl alcohol with a hydroxymethyl-containing alkylphenol resol based on bifunctional alkylphenols at elevated temperature and to dissolve the reaction product in at least one reactive diluent from the group consisting of benzyl alcohol, low-molecular epoxy compounds, furfurol, difuryl ether, furfuryl alcohol to avoid the otherwise considerable shrinkage of furan cements. The addition of low-molecular epoxy compounds does not affect the elastic behavior of the cured products, but they have a certain sensitivity to some aggressive, organic solvents which in practice are of importance for a number of cases, such as ketones, chlorinated and aromatic hydro-carbons, and esters.

The presence of furfuryl alcohol in plastic cements composed of 1.5–1.6% by weight of furfuryl alcohol, 14–16% by weight of furan-epoxy binder, 2.8–3.2% by weight of polyethylenepolyamine and mineral fillers is said by another publication (Soviet Pat. No. 619,464) on the one hand to increase the strength of these cements and on the other to reduce shrinkage. Such a material finds utility in the construction industry for producing corrosion-resistant coatings and as chemically resistant material for floor coverings. However, the shrinkage, being 0.75%, is relatively high.

These crosslinked products are likewise not suitable for preparing cement resins or cements which are subject to high chemical stresses, since, owing to their amine content, they inhibit the acid catalysis required for curing the cement and, moreover, in the crosslinked state are not sufficiently acid- and alkali-resistant.

German Auslegeschrift No. 1,113,565 discloses the reaction of epoxy resins with furfuryl alcohol in the presence of Friedel-Crafts compounds, metal fluoroborates or boron trifluoride as catalysts. However, this method produces only cured plastics such as casts but not storable resin solutions.

U.S. Pat. No. 4,100,314 proposes the use of a synthetic resin solution as a coating agent for tar-impregnated coal bodies which comprises crosslinking furan compounds, for example a mixture of equal parts of furfurol and furfuryl alcohol, diethyl sulfate as catalyst and epoxy resins. Crosslinking is effected at temperatures between 100° and 135° C., which is not suitable for preparing cements if only for that reason, since these have to be crosslinked at room temperature or at least in the vicinity of room temperature.

It is further known to modify furan resins in diverse ways. For instance, furfurol can be reacted with phenol to give novolaks which serve for preparing phenolic resin compression molding compositions. However, these resins are not suitable for preparing cements if only because of their excessively high intrinsic viscosity.

It is also known to modify condensates of furfuryl alcohol with urea and formaldehyde and to use these polycondensates as core binders. But even the known inclusion of phenol in this modification does not alter the inadequate chemical resistance and low thermal resistance of these polycondensates, which is generally necessary in the preparation of core binders.

Nor does the known reaction of furfuryl alcohol with phenols or with resorcinol lead to suitable resins for cements or coating compositions, but to resins which are useful only as binders for glues, compression molding compositions or paints. Nor does the reaction between hydroxybenzyl alcohol and furfuryl alcohol produce any useful cement resin. When such polycondensates are mixed with a filler which contains acid catalysts a violent polycondensation reaction occurs. The cured product thus obtained undergoes shrinkage and moreover lacks resistance to alkali.

German Offenlegungschrift No. 2,750,704 describes the preparation of reaction products of hydroxyaromatic compounds, formaldehyde and furfuryl alcohol, wherein the furfuryl alcohol can if desired also be used in such an excess that it acts as a solvent. Furthermore, the reaction product can be cured with acid catalysts. These known, furfuryl alcohol modified resol resins are said by this publication to be used with other monomers such as isocyanates, to give flame-retardant compact moldings, but preferably foam materials. The preparation of cements is not mentioned.

The furan resins customarily used to date in the preparation of acid-curing cements produce cements having very high chemical resistance. In particular, the furan cements are highly alkali-resistant. On the other hand, disadvantages of furan cements are their relatively high brittleness, which rules out their use for certain applications, for example for cementing machine components but in particular their use in coating compositions, with which the present invention is more specifically concerned. The modulus of elasticity of the cured cements is 1.2 to 2.0 $10^6$ N/cm$^2$. This relatively high modulus of elasticity of the previously used furan resin cements is disadvantageous owing to the attendant brittleness. The brittleness can have the effect that, in acid-resistant ceramic slab paving laid with furan resin cement, detachment from the ground and cracks can easily arise when the different thermal expansion coefficients of cement, ceramic materials and ground become active as a result of temperature cycles or changes. This is because the lower the modulus of elasticity of the cement, the more sensitive the system comprising cement, ceramic material and ground is to cracking and detachment on change in temperature. The cement is then less brittle and consequently larger deformations are possible without cracking and detachment occurring. The heat resistance of the previously used furan resin cements was in general about 200° to 210° C. The same relationships also apply to coating compositions. Owing to the disadvantages mentioned, the use of these furan resins for cements or coating compositions have previously not been described. It is therefore desirable to have cements and coating compositions which are free of these disadvantages described.

The invention, then, relates to resin solutions for cements and coating compositions and to a process for their preparation wherein epoxy resins are dissolved in furfuryl alcohol alone or in mixture with other furan derivatives and are reacted at temperatures between 20° and 200° C., preferably between 40° and 140° C., in the presence of catalysts and wherein, if desired, the catalyst is neutralized after the reaction and the reaction mixture has reactive diluents added to it.

Surprisingly, the cements prepared according to the invention not only have a long storage life but also have all the favorable properties of furan resin cements, an excellent chemical stability and a thermal stability up to temperatures of 320° C. In addition, the cements shrink very little. Moreover, they combine a high use life with a shorter curing time and are nonetheless highly resistant to chemicals.

The epoxy resins used can be any epoxy resin which contains more than one epoxy group per molecule, for example those which are prepared by reacting epihalogenohydrins with polyhydric alcohols or polyglycol ethers or by epoxidation of double bonds, for example by epoxidation of unsaturated fatty oils or unsaturated hydrocarbons, for example dicyclopentadiene, butadiene and so on. Preference is given to epoxy resins which are obtained from diphenylalkanes or higher polyphenylolalkanes such as novolaks and epihalogenohydrins or dihalogenohydrins, preferably epichlorohydrin. Their epoxy equivalent weight is in general 150 to 2000, preferably 170 to 1200.

The epoxy resins are reacted with furfuryl alcohol or in mixture with other furan derivatives by dissolving the epoxy resins, for example in furfuryl alcohol, and reacting them at temperatures between 20° C. and 200° C., preferably between 40° C. and 140° C., in the presence of catalysts until the epoxy groups have been converted. Completeness of conversion can be monitored by determining the epoxy content of the reaction batch or by determining the residue on drying.

While, if acid catalysts are used, they need to be neutralized after the reaction, such a neutralization is not always necessary if basic catalysts are used.

Possible catalysts for the reaction of the epoxy resins with furfuryl alcohol are strong mineral acids, alkylsulfonic acids or arylsulfonic acids. However, it is preferable to use basic catalysts. Suitable catalysts are in particular the hydroxides of the alkali metals, for example also in the form of their aqueous solutions. It is likewise possible to use as catalysts tertiary alkylamines having 1–6, preferably up to 4, carbon atoms, in the alkyl radical, such as trimethylamine, triethylamine, tert.-butylamine and so on. It is also possible to use those trialkyls which additionally have primary or secondary amino functions, for example dimethylaminopropylamine. If these amines, which are incorporated into the epoxy resin via their primary and/or secondary amino groups, are used, it is necessary to ensure that their amount is only so low as not to impair the subsequent acid curing. If the amine catalysts are used in a larger amount, their removal from the reaction mixture, for example by salt formation, is however in general always advisable.

It is also possible to use in addition to furfuryl alcohol other furan derivatives such as furfurol, hydroxomethylfurfurol, difuryl ether and others. These compounds can be present from the start during the reaction or can be mixed in afterwards, an excess acting as a reactive diluent.

The invention also relates to the use of the resin solutions prepared according to the invention for cements and coating compositions by mixing the resin solution immediately before use with A. at least one filler and B. at least one curing agent, the weight ratio of the resin solution to the sum of components A and B being 1:(0.5 to 7), preferably 1:(1 to 4). The resin solutions used generally have a solid resin content of 10 to 75, preferably 25 to 70, in particular 45 to 55% by weight of solids content.

The modified furan resins are in accordance with the claimed use generally used in reactive diluents, the weight ratio of diluent to solid resin (A) being (0.4 to 1.5):1, preferably (0.6 to 1.1):1. Diluents are for example benzyl alcohol, low-molecular epoxy compounds such as diglycidyl ether, diphenylolpropane diglycidyl ether, but in particular furfurol, difuryl ether, preferably furfuryl alcohol. The latter and the furan components can already be present in excess from the start as early as the reaction with the epoxy compounds. The storability of the resin solutions is practically unlimited. Their viscosities are in general between 50 and 20,000, preferably 100 and 15,000, mPa.s/20° C.

As filler (A) in the preparation of the cements it is possible to use rock flours such as clay and chamotte, barium sulfate, quartz flour and preferably coke flour or graphite flour, for example artificial graphite.

As curing agent (B) for curing the cements it is possible to use acid and/or acid-forming substances, for example (a) inorganic or organic acids, such as sulfuric acid, hydrochloric acid, phosphoric acid, usually in aqueous solution, oxalic acid, sulfonic acids, such as amidosulfonic acid, monosulfonic and disulfonic acids of benzene, toluene, xylene, and also naphthalenedisulfonic acids and/or (b) acid-eliminating substances such as sulfochlorides of the sulfonic acids mentioned in (a), for example toluene- or benzene-sulfochloride, alkyl esters of these sulfonic acids or acid sulfate esters and/or (c) acid salts of sulfuric acid or phosphoric acid, preferably their sodium salts. It also is possible to use adducts of urea and aromatic sulfonic acids individually or in mixture with the above resins. The curing agent accounts of 4 to 12, preferably 6 to 8,% by weight of the filler/curing agent mixture.

The cements are prepared by mixing the solution of the furan resin with a filler (A) and catalyst or curing agent (B) immediately before use. In general, a mixture of filler and curing substance, the so-called cement flour, is prepared in advance and is added to the furan resin solution. The cement obtained is then applied in conventional manner onto or between the materials to be cemented. The cement is rated on the basis of the properties of the furan resin; the properties of the cement after mixing the furan resin with the cement flour; the course of curing; and the chemical and physical properties of the end product. The furan resin used should have a low degree of condensation and thus posses a low viscosity, so as to be free-flowing and give good wetting of the filler. If necessary, the reactive diluent content needs to be set so as to ensure processability. Along storage life is a further prerequisite for optimal use. The degree of condensation should increase only insignificantly during storage, since an excessive increase in viscosity would lead to poorer wetting of the filler and hence to processing faults.

The cement is prepared immediately before use. After the filler has been mixed with the furan resin, the action of the catalyst brings about an immediate enlargement of the furan resin molecule. The pot life, i.e. the time between mixing and loss of processable consistency, should in general amount to 30 minutes to 2 hours, so as to ensure comfortable processing. After processing, it is desirable for the cement to be cured at room temperature in as short a time as possible and to become resistant to chemicals and solvents.

In the examples which follow, parts and %ages are by weight.

EXAMPLES

1a) Preparation of the resin 1425 parts of an epoxy resin based on diphenylolpropane and epichlorohydrin and having an average epoxy equivalent weight of 425 were dissolved in 2,013 parts of furfuryl alcohol in a reaction vessel equipped with a stirrer and a thermometer and the solution was brought to a temperature of 60° C. After addition of 25.5 parts of 33% strength aqueous sodium hydroxide solution, the batch was heated to 100° C. and was stirred at that temperature for 4 hours.

The resin solution had a residue (1 h/170° C.) of 49.3% and a viscosity of 1250 mPa.s/20° C. The alkali catalyst contained therein was neutralized with 19.1 parts of 80% strength lactic acid, producing a solution having a viscosity of 1200 mPa.s/20° C.

Application testing

1b) Preparation of cement: for this test a cement flour (100 parts) was prepared from 93 parts of carbon, 6 parts of a β-naphthalenesulfonic acid/urea adduct and 1 part of p-toluenesulfonic acid and was mixed with 60 parts of the resin solution (1a). The cement prepared therefrom had a pot life at 20° C. of 75 minutes and after 24 hours had attained a Shore D hardness value of 45.

Chemical test

1c) To determine the chemical resistance, cylindrical bodies measuring 25 mm in both height and diameter were prepared from the cement and were stored at 20° C. for 8 days. After that period the test specimens were resistant to boiling 70% strength sulfuric acid, boiling concentrated hydrochloric acid and concentrated and dilute sodium hydroxide solution.

Physical tests

1d) The linear shrinkage was measured on cylindrical test specimens which measured 25 mm in diameter and 90 mm in length and to the ends of which measurement marks made of glass have been attached. The overall length, including the measurement marks, was 100 mm. The test was carried out in line with the ASTM method C 358. The first measurement of the length was carried out 24 hours after preparing the test speciment and was used as the starting value. Within a period of observation of 94 days the shrinkage at room temperature amounted to 0.18%.

Determination of the modulus of elasticity of flexure (see table).

2a) Preparation of the resin

As in Example 1, 1,425 parts of an epoxy resin based on diphenylolpropane and epichlorohydrin and having an average epoxy equivalent weight of 950 were dissolved in 1,714 parts of furfuryl alcohol; 25.5 parts of 33% strength sodium hydroxide solution were added at 60° C.; and the temperature was then raised to 100° C. After stirring at that temperature for 4 hours the resin had a residue of 49.5% (1 hour/170° C.) and a viscosity of 13,500 mPa.s.

After neutralization with 19.1 parts of 80% strength lactic acid the viscosity dropped to 12,500 mPa.s.

Application Testing

2b) Preparation of the cement

For the test, a cement flour (100 parts) was prepared from 93 parts of carbon and 6 parts of β-naphthalenesulfonic acid/urea adduct and one part of p-toluenesulfonic acid and was mixed with 75 parts of resin solution 2a) as in Example 1. The cement prepared therefrom had a pot life at 20° C. of 80 minutes and after 24 hours had a Shore D hardness value of 60.

Chemical test

2c) To determine the chemical resistance, cylindrical bodies measuring 25 mm in both height and diameter were prepared from the cement and were stored at 20° C. for 8 days. After that period the test specimens were resistant to boiling 70% strength sulfuric acid, boiling concentrated hydrochloric acid and concentrated and dilute sodium hydroxide solution.

Physical tests

2d) The linear shrinkage was measured as in Example 1d). Within a period of observation of 94 days the shrinkage at 20° C. amounted to 0.2%.

Determination of the modulus of elasticity of flexure on test specimens 10×15×120 mm:

| Modulus of elasticity ($10^4$ N/mm$^2$) after | Example 1 | Example 2 |
|---|---|---|
| 8 days at 20° C. | 0.44 | 0.52 |
| after 28 days at 20° C. | 0.63 | 0.60 |
| after 28 days at 20° C. plus 16 hours at 90° C. | 0.59 | 0.58 |

We claim:

1. A resin solution for cements and coating compositions based on a reaction product consisting essentially of epoxy resins with more than one epoxy group on the molecule and having an epoxy equivalent weight of 150 to 2000 and furfuryl alcohol alone or in mixture with other furan derivatives dissolved in reactive diluents, provided that all the epoxy groups of the epoxy resin are reacted with furfuryl alcohol or other furan derivatives.

2. A resin solution as claimed in claim 1, wherein all the epoxy groups of the epoxy resin are reacted with furfuryl alcohol or other furan derivatives.

3. A resin solution as claimed in claim 1, wherein the weight ratio of reactive diluents to solid resin A is (0.4 to 1.5):1.

4. A resin solution as claimed in claim 1 wherein the resin solution has viscosities between 50 and 20,000 mPa.s/20° C.

5. A resin solution as claimed in claim 1, wherein the furan derivatives used are furfurol, hydroxymethylfurfurol or difuryl ether.

6. A process for preparing resin solutions for cements and coating compositions, which comprises dissolving epoxy resins having more than one epoxy group in the molecule and having an epoxy equivalent weight of 150 to 2000 in furfuryl alcohol alone or in mixture with other furan derivatives and reacting them at temperatures between 20° and 200° C. in the presence of acid or basic catalysts, provided that all the epoxy groups of the epoxy resin are reacted with furfuryl alcohol or other furan derivatives.

7. Process as claimed in claim 6, wherein the catalyst is neutralized after the reaction and reactive diluents are added in addition to the reaction mixture.

8. Process as claimed in claim 6, wherein the reaction temperature is 40° to 140° C.

9. Process as claimed in claim 6, wherein all the epoxy groups of the epoxy resin are reacted with furfuryl alcohol or other furan derivates.

10. Process as claimed in claim 6, wherein the weight ratio of reactive diluents to solid resin A is (0.4 to 1.5):1, preferably (0.6 to 1.1):1.

11. Process as claimed in claim 6 wherein the resin solution obtained has viscosities between 50 and 20,000 mPa.s/20° C.

12. Process as claimed in claim 6, wherein the furan derivatives used are furfurol, hydroxymethylfurfurol or difuryl ether.

13. Cements and coating compositions in which the resin solution as claimed in claim 1 is mixed immediately before use with (A) at least on filler and (B) at least one curing agent or a mixture of (A) and (B), the weight ratio of the solution to the sum of components (A) and (B) being 1:(0.5-7).

14. Cement and coating compositions as claimed in claim 13, wherein component (A) is rock flour, barium sulfate, quartz, coke or graphite flour.

15. Cement and coating compositions as claimed in claimed 13, wherein component (B) is an acid, an acid-forming substance or both.

16. Cement and coating compositions as claimed in claim 13, wherein a mixture of component (A) and (B) which has been prepared in advance is used.

17. Cement and coating compositions as claimed in claim 13, wherein the resin solution has a solid resin content of 10 to 75% by weight.

* * * * *